(12) United States Patent
Jaffe et al.

(10) Patent No.: US 6,510,518 B1
(45) Date of Patent: Jan. 21, 2003

(54) BALANCED CRYPTOGRAPHIC COMPUTATIONAL METHOD AND APPARATUS FOR LEAK MINIMIZATIONAL IN SMARTCARDS AND OTHER CRYPTOSYSTEMS

(75) Inventors: Joshua M. Jaffe, San Francisco, CA (US); Paul C. Kocher, San Francisco, CA (US); Benjamin C. Jun, Palo Alto, CA (US)

(73) Assignee: Cryptography Research, Inc., San Francisco, CA (US)

( * ) Notice: Subject to any disclaimer, the term of this patent is extended or adjusted under 35 U.S.C. 154(b) by 0 days.

(21) Appl. No.: 09/325,611

(22) Filed: Jun. 3, 1999

Related U.S. Application Data

(60) Provisional application No. 60/087,879, filed on Jun. 3, 1998.

(51) Int. Cl.[7] .................................................. G06F 1/24

(52) U.S. Cl. ........................ 713/168; 713/171; 713/200; 713/201

(58) Field of Search ................................ 713/168, 171, 713/200, 201, 152

(56) References Cited

U.S. PATENT DOCUMENTS

| | | | | |
|---|---|---|---|---|
| 4,107,458 A | * | 8/1978 | Constant | 380/264 |
| 4,139,839 A | * | 2/1979 | Fletcher et al. | 341/81 |
| 4,569,052 A | | 2/1986 | Cohn et al. | 371/38 |
| 4,605,921 A | * | 8/1986 | Riddle et al. | 341/52 |
| 4,908,038 A | | 3/1990 | Matsumura et al. | 902/5 |
| 5,401,950 A | | 3/1995 | Yoshida | 235/487 |
| 5,511,123 A | | 4/1996 | Adams | 380/29 |
| 5,551,013 A | | 8/1996 | Beausoleil et al. | 395/500 |
| 5,710,834 A | * | 1/1998 | Rhoads | 380/202 |

OTHER PUBLICATIONS

Kocher, P. "Timing Attacks on Implementations of Diffie–Hellman, RSA, DSS and Other Systems." in: Koblitz, N., *Advances in Cryptology–CRYPTO'96* (Berlin, Springer, 1996), pp. 104–113.

(List continued on next page.)

*Primary Examiner*—Thomas R. Peeso
(74) *Attorney, Agent, or Firm*—Joseph Yang; Thomas R. Lane; Skadden, Arps

(57) ABSTRACT

Cryptographic devices that leak information about their secrets through externally monitorable characteristics (such as electromagnetic radiation and power consumption) may be vulnerable to attack, and previously-known methods that could address such leaking are inappropriate for smartcards and many other cryptographic applications. Methods and apparatuses are disclosed for performing computations in which the representation of data, the number of system state transitions at each computational step, and the Hamming weights of all operands are independent of computation inputs, intermediate values, or results. Exemplary embodiments implemented using conventional (leaky) hardware elements (such as electronic components, logic gates, etc.) as well as software executing on conventional (leaky) microprocessors are described. Smartcards and other tamper-resistant devices of the invention provide greatly improved resistance to cryptographic attacks involving external monitoring.

34 Claims, 8 Drawing Sheets

OTHER PUBLICATIONS

"Security Requirements for Cryptographic Modules," Federal Information Processing Standards Publication (FIPS PUB) 140–1, U.S. Department of Commerce, National Institute of Standards and Technology, Jan. 1994.

Ryan, J. "Blinds for Thermodynamic Cipher Attacks," unpublished material on the world wide web at *http://www.cybertrace.com/thrmatak.html* Mar. 1996.

"Data Encryption Standard," Federal Information Processing Standards Publication (FIPS PUB) 46–2, U.S. Department of Commerce, National Institute of Standards and Technology, Dec. 30, 1993.

Biham, E. et al., "Differential Fault Analysis of Secret Key Cryptosystems" in: Kaliski, B., *Advances in Cryptology— CRYPTO 97*, (Berlin, Springer, 1997) 17th Annual International Cryptology Conference, Aug. 17–21, 1997, pp. 513–525.

Peter Wayne, "Code Breaker Cracks Smart Cards' Digital Safe" Jun. 22, 1998, http://www.nytimes.com/library/tech/98/06/biztech/articles/22card.html.

* cited by examiner

BALANCED CRYPTOGRAPHIC COMPUTATIONAL METHOD AND APPARATUS FOR LEAK MINIMIZATIONAL IN SMARTCARDS AND OTHER CRYPTOSYSTEMS

This application claims the benefit of U.S. provisional patent application No. 60/087,879, filed on Jun. 3, 1998.

This application is related to co-pending U.S. patent application No. 09/224,682, filed on Dec. 31, 1998.

FIELD OF THE INVENTION

The method and apparatus of the present invention relate generally to cryptographic systems and, more specifically, to cryptographic tokens that must maintain the security of secret information in hostile environments.

BACKGROUND OF THE INVENTION

Many cryptographic devices must maintain and manipulate secret parameters in hostile environments without revealing their values. Examples of such devices include, without limitation, secure identity tokens, smartcards, electronic purses, television descrambling systems, cellular telephone security systems, etc. Uses of such secret parameters include, without limitation, performing digital signatures as part of a challenge-response protocol, authenticating commands or requests, authenticating executable code updates, encrypting or decrypting arbitrary data (as in a secure key storage/cryptographic acceleration unit), etc. For example, a smartcard used in a stored value system may digitally sign or compute the Message Authentication Code (MAC) of parameters such as the smartcard's serial number, balance, expiration date, transaction counter, currency, and transaction amount as part of a value transfer. Compromise of the secret key used to compute the signature or MAC may allow an attacker to perform fraudulent transactions by forging MACs or signatures.

The power consumed by a microprocessor over a given clock cycle is generally a (usually complicated) function of the processor's state and state changes. In the background art, binary ones and zeros are often represented as high or low voltage levels. The amount of current that a component (such as a resistor or transistor) draws is a function of the voltage(s) applied across it. (The specific relationship between voltage and current depends on the component. For example, resistors tend to be fairly linear, while transistors can be quite nonlinear.) The total amount of power consumed by a device is a combination of the contributions from many individual circuit elements, each responding to its local voltage environment. A difference in a single bit in the input to a computation, for example, causes a register to hold a different value (that is, voltage level), and can influence the inputs (and outputs) of many gates through which the computation path flows. Therefore, the combination of the contributions from many individual circuit elements can lead to a difference between the amount of power being consumed when the bit is one and the amount consumed when the bit is zero.

Additionally, state changes are a major factor affecting the power consumption of a device performing a computation. As the value of a bit changes, transistor switches associated with that bit change state. There is an increase in the amount of power consumed when the system is in transition. The relative magnitude of variations in power consumption will depend, in part, on the family of logic used. For example, with CMOS logic, changes in the system state have a pronounced effect on power consumption.

The amount of electromagnetic radiation produced by a computational device is a function of the electrical charge movements within it. The amplitude, frequency, and direction of charge flows within a processor are determined by the layout and impedance of the pathways through which charge flows in the device. They are also functions of the device's state and alterations between states, and vary with the parameters of a computation.

Some devices in the background art, such as those shielded to U.S. Government Tempest specifications, use techniques to hinder external monitoring. Generally, these methods focus on isolating devices from potential eavesdroppers. Such techniques include using large capacitors and other power regulation systems to minimize variations in power consumption, enclosing devices in well-shielded cases to prevent electromagnetic radiation, buffering input and output to prevent signals from leaking out on I/O lines, and surrounding vulnerable devices with epoxy to prevent invasive attacks. Sometimes such techniques for hindering monitoring are combined with active tamper detection and resistance measures (such as voltage, pressure or temperature sensors, fine wires or membranes, etc.) which may cause the device to shut down or self-destruct when external monitoring is suspected.

However, these techniques are ill suited for use in smartcards, secure microprocessors, and other small devices that cannot easily be physically isolated from their environments. While they can be useful in detecting active and invasive attacks against a system, tamper detection techniques are limited in that they do not prevent the exploitation of information that leaks during normal operation of a system. In smartcards and other small, low-cost, poorly-shielded devices that must resist monitoring attacks and other kinds of tampering, both active and passive countermeasures of the background art are often inapplicable or insufficient due to reliance on external power sources, physical impracticality of shielding, cost, and other constraints.

Thus, methods for reducing leakage that are practical to implement in small, physically constrained, low-cost cryptographic tokens (devices) such as smartcards, are needed.

SUMMARY OF THE INVENTION

The present invention introduces techniques for minimizing or effectively eliminating information leaks from cryptosystems that result from power consumption fluctuations, electromagnetic radiation, and other externally measurable attributes. Methods of the invention to reduce leakage include transforming the underlying transistor-and-wire level representation of bits and transforming computational processes and circuits. The transformations can make attributes associated with common sources of information leakage from cryptographic devices invariant for all possible valid inputs to a computation. By reducing or eliminating leakage, security against external monitoring attacks is greatly improved.

The present invention transforms the basic representation of data. A constant Hamming weight data representation replaces conventional bit representations commonly employed in the background art. The present invention also transforms the algorithms, working with the balanced Hamming weight representation, to perform calculations while holding the number of internal transitions invariant at each step. For example, exemplary fixed transition rate algorithms for computing NAND, NOT, NOR, and XOR operations are presented which work with data in this representation. The present invention also introduces a-statemaintenance step which, when executed between subsequent operations, assures that the number of state transitions between operations does not reveal information about the parameters of computation. These techniques have direct analogs in hardware; exemplary methods for implementing hardware gates with balanced Hamming weight representations and state transitions are presented.

Leakless gate embodiments of the present invention are also presented. The term "leakless" is used to describe methods and devices that provide either no leaked information, or significantly reduced amounts of leaked information, to attackers; some embodiments of "leakless" systems may be imperfect in that they leak some information. Leakless functions can be built out of such gates to provide improved security in cryptographic applications. For example, these gates may be used to implement functions, such as but not limited to cryptographic algorithms, in devices of all kinds, including, without limitation, cryptographic coprocessors and general-purpose microprocessors.

The present invention can be embodied in a variety of forms, including, without limitation, software, firmware, and microcode. Alternatively, the leak minimizing design principles of the invention can be used to implement cryptographic functions directly in hardware, e.g., by using constant Hamming weight data representations and tailoring implementations of cryptographic algorithms such that the number of transitions at a given step is independent of the data.

A cryptosystem system that leaks too much information about its secrets is insecure. Methods of the present invention may be used to reduce the amount of information leaking from cryptosystems. The leak minimization techniques of the present invention can make systems secure against external monitoring attacks if leakage rates are reduced enough such that keys or other secret data will not be compromised within the lifetime of the system or the secret. For example, if the attack work factor exceeds the maximum number of transactions the device can perform, attackers cannot collect enough measurements to compromise the secret. Embodiments of the invention can combine leak minimization techniques (which reduce the amount of information leaking) with leak resistance techniques (which maintain security even if some information does leak) and noise introduction techniques (which mask leaked information).

DETAILED DESCRIPTION OF THE INVENTION

Introduction

Figure 1:
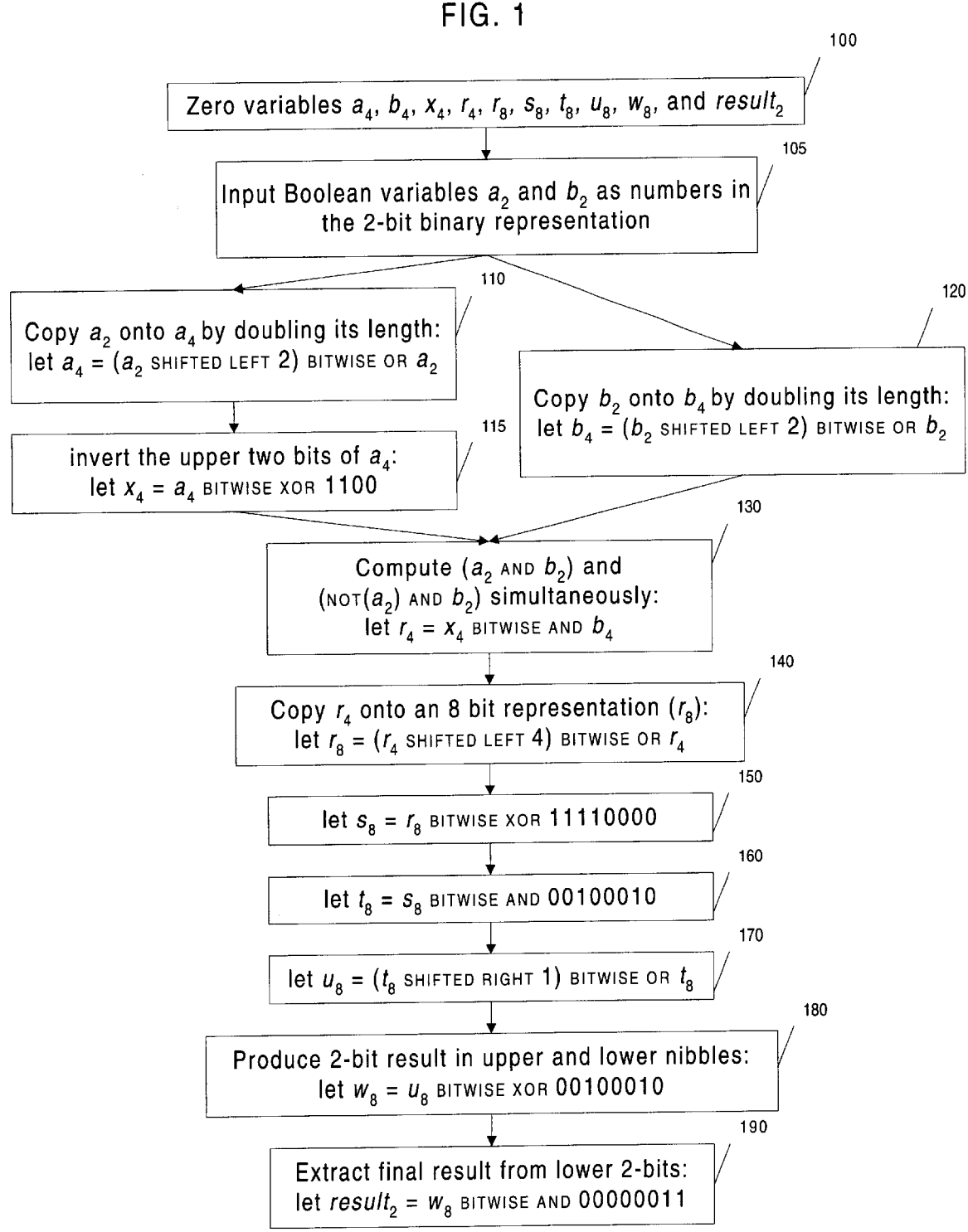
FIG. 1 shows an exemplary leak minimized method for computing NAND.

There are many ways in which information correlated to secrets can leak from cryptographic tokens. For example, recent work by Cryptography Research has shown that attackers can often extract secret keys non-invasively using external monitoring attacks. Measurable attributes of cryptographic devices that vary with the calculation (including, without limitation, the amount of current drawn and the electromagnetic radiation emanated) are often correlated to the secrets being manipulated. Such signals can be measured and analyzed by attackers to recover secret keys.

The present invention reduces the amount of information about secret parameters leaked from cryptosystems. Sufficient leakage rate reduction can make a system secure by reducing the leakage rate to a low enough level that attacks are not feasible (for example, if the secrets will not be compromised within the device's operational lifetime).

The invention is described using embodiments including specialized data representations, methods of computation, and pre- or inter-computation state maintenance procedures. In these embodiments, sources of information leaked from a system, such as signals correlated to bit values, Hamming weights of the data, and state transitions during computational operations are held invariant with respect to the parameters of the computation.

Embodiments of the invention include leak-minimizing, low-level logic gates. Such gates are implementable in hardware or software. Digital circuits and complex algorithms (particularly cryptographic operations) may be implemented using the logic gates of the present invention, in order to improve their security.

Exemplary implementations of the invention are described using standard logic gates and/or standard microprocessor byte-oriented logic operations. Like other digital circuits, computational portions of cryptographic tokens are constructed using analog components, such as resistors, transistors, capacitors, inductors, diodes, wires, etc. (which are well known to one of skill in the art). Conventional implementations of these components "leak" information about their inputs and outputs in their power consumption and other externally measurable characteristics. Components are combined to create gates, flip-flops, switches, buffers, registers, memory storage elements, and other logical and functional elements of digital circuit design, using methods known to those of skill in the art. Gates of the background art, designed out of these leaky components, themselves leak information. One objective of the invention is to enable construction of leakless gates using standard (leaky) logic gates or other components that leak, thus enabling the production of secure systems using existing processors, circuit components, integrated circuit fabrication processes, etc.

Constant Hamming Weight Representation

In one embodiment, the invention uses a constant Hamming weight representation of data in its internal operations. Operations are performed using a data representation such that the Hamming weight of all input values is constant. Thus the data to be manipulated at the bit level differs from the traditional binary representation of the numbers being manipulated. For example, the logic value TRUE is traditionally treated as a synonym for the number "one," and represented by the binary digit 1, and the logic value FALSE is traditionally synonymous with the number "zero," represented by the binary digit 0. In hardware, these 1's and 0's can be represented, for example, by a voltage level carried on a wire (for example, where +5V corresponds to 1), by a charge held in a capacitor, or by the state of a transistor switch, etc.

In the following exemplary embodiment of the invention, traditional representations are replaced with analogous constant Hamming weight representations. In the exemplary constant Hamming weight representation, each traditional binary digit requires at least one pair of lower level entities to be represented. A simple constant Hamming weight representation maps "one" onto the two-digit binary number 10, and "zero" onto 01.

Other constant Hamming weight representations employed by the exemplary implementations include mappings such as (TRUE, FALSE) to (01, 10), (0101, 1010), (0110, 1001), and (00010010, 00100001) to list a few. Note that representations in which the TRUE value is the bitwise inverse of the FALSE value are often more convenient to use than others, but such representations are not necessary. It can be advantageous to use different constant Hamming weight representations in different parts of a method or apparatus, and to convert among them if necessary during the course of a computation.

It should be noted that in the background art constant Hamming weight representations have been described in some (non-cryptographic) communications systems where bits are manipulated sequentially. Some serial communications systems require at least one state transition within a given time interval. Coding a one as the two-digit binary number 10 and a zero as the binary number 01 is used to assure there will be one transition per bit transmitted.

Fixed Transition Count Computation

In some embodiments of the present invention, the number of transitions (whether they be, without limitation, in bit values, gate inputs/outputs, logic levels, transistor switches, memory cells, etc.) that take place in the course of a transaction are independent of the secret data parameters (or, better, all data parameters) involved in the computation. For example, in the example NAND embodiment below, whenever a (leaky) AND operation is used, all four possible cases ('0 AND 0', '0 AND 1', '1 AND 0', and '1 AND 1') are calculated simultaneously. Measurable external characteristics of such an operation are mostly or completely independent of the order of the bits within the input registers. For example, the processes of computing '0101 AND 0011' and '1100 AND 0110' are balanced, i.e., they should have identical or very similar external characteristics.

As noted, the number of transitions that take place during the computation can be kept constant. In traditional devices, the number of transitions is a function of the current and/or previous state(s) of the device, including the parameters of the particular computation. Using the present invention, leakless devices can be designed for which the type and timing of state transitions during each part of a computation are independent of the parameters of the computation. A useful technique of the invention for accomplishing this is a state preparation or state maintenance step, in which the computational apparatus is placed into a state with defined characteristics between operations. The simplest such process is to set system variables (bits, memory locations, transistor levels, etc.) to a fixed intermediate value immediately before a value of the computation flows into the computational system and/or when the computation completes. State maintenance steps help prevent specific types of information from leaking.

For example, moving the value 01 into a register that contains the value 10 would result in two bit transitions (i.e., changes in the states of the various transistor switches, capacitors, etc. associated with those two bits.) Had the register already contained the value 01, however, no bit transitions would have occurred. This leads to a difference that may be distinguishable to an attacker. Such problems can be avoided, for example, if the register is set to the value 00 (or, alternatively, 11) immediately prior to a move operation. It is also possible to erase the value from a register sometime other than immediately prior to a move operation. If the register value is known to have a constant Hamming weight representation, setting the register to the intermediate value 00 (or 11) will always cause a constant number of state transitions. Copying in the new value will also always cause a constant number of bit transitions, in this example, a single bit transition. If the register is also used to store values which do not need to be kept secure, and if these inconsequential values are not stored in the constant Hamming weight representation, the register initialization step will dispose of these values while still maintaining the integrity of incoming constant Hamming weight variables. In general, state maintenance steps can be applied to the various intermediates such as variables, registers, latches, transistors, etc. through which a secure computation will flow.

When leakless gates are implemented in software, the gate functionality is computed through a series of operations on intermediate values that may be stored in registers (or other memories). As these memories are modified, the number of bit transitions between subsequent values might be constant for a given step in the algorithm even without state maintenance steps. For example, the complement of a constant Hamming weight value is also a constant Hamming weight value, so overwriting a number with its complement results in a fixed number of bit transitions. Thus, it is sometimes unnecessary to perform some of the described steps (such as state maintenance steps), and computational processes can often be optimized without impacting security.

Introduction to the Leakless NAND

Major factors affecting the power consumed by a given microprocessor instruction include: (a) the Hamming weight of the input(s), intermediate, and/or output variables (including internal state such as processor flags, in some cases), and (b) the number and type of state transitions that take place during the computation described by the instruction. In the following exemplary implementation, exemplary apparatuses and methods are presented for computing logic operations such that throughout the computation these characteristics are independent of the input parameters and computational results.

An exemplary leakless embodiment of the logical operation NAND is presented first. This NAND gate is constructed using the standard binary operations AND, XOR, OR, and RIGHT SHIFT. (A RIGHT SHIFT operation shifts a register a fixed number of bits to the right and fills vacated bits at the left with zero.) These operations were selected because they are implemented on most microprocessors and microcontrollers and are also efficient and simple to implement in hardware. For example, the Intel x86 processor family implements these operations with the assembly language instructions AND, XOR, OR, and SHR.

The exemplary embodiments can be implemented in many different computational environments, including, but not limited to, one with the characteristics described in the following paragraphs. The effectiveness of the embodiment's leakless characteristics may depend on the specific characteristics of the computational environment. These characteristics are explained for exemplary purposes only and should not be interpreted as limiting the applicability or scope of the invention in any way.

As noted previously, individual logic gates may leak the Hamming weight of each of the operands, the number of bit (state) transitions involved in transforming the operands into the result, and (in microprocessors and other such embodiments) the value of carry or overflow flags. One characteristic of the computational environment of the exemplary embodiment is that all bits of instruction operands (at least for the bit operations listed above) are operated on simultaneously, and individual bits within an operation are treated equivalently. For example, if the XOR of two eight-bit registers is computed using an assembly-language XOR instruction, the result is computed through an eight-bit-wide XOR computation path. If the implementer has full control over a hardware implementation, an array of eight identical standard XOR gates in parallel, using circuit matching (as described later), can be used. Simultaneous operation on all bits is used in this embodiment so that differences in timing of power consumption and other externally-measurable fluctuations will not leak information about specific bit values.

Another characteristic of the exemplary design is that RIGHT SHIFT operations can leak the value of any discarded bits, but information about other bits (such as the high-order bit when using an eight-bit register) does not leak. Also, assignment operations do not leak more than the Hamming weight of the old and new values and the number of bit transitions between the old and the new values. Since the difference in the number of bits between successive values in a memory location might leak, in the exemplary embodiment, the bits of target locations are first zeroed before assignments are made. This step can be skipped in certain instances, however, if it can be shown that the number of bit transitions due to the change would, in those cases, be independent of the parameters of the computation.

In practice, some real world systems may not behave exactly as described here, and in these and some other cases, some information may leak from the operation. However, such systems can still have many of the beneficial characteristics provided by the invention and be significantly more secure than corresponding systems not employing the invention. In such cases, additional leak resistance and/or leak minimization techniques can optionally be used to provide additional sufficient security.

The Leakless NAND

The NAND operation is well known in the background art. It produces a single Boolean output as a function of two Boolean inputs, according to the following table:

| Input 1 | Input 2 | Result |
|---------|---------|--------|
| FALSE | FALSE | TRUE |
| FALSE | TRUE | TRUE |
| TRUE | FALSE | TRUE |
| TRUE | TRUE | FALSE |

An exemplary leakless NAND computation process is shown in FIG. 1. At step 100, intermediate processing variables (e.g., $a_4, b_4, x_4, r_4, r_8, s_8, t_8, u_8, w_8$, and $result_2$) are initialized to known states (for example, the (binary) values 00, 0000, or 00000000, but others are possible as discussed above). In an alternate embodiment of the invention, initialization is performed using random states, such that average characteristics are preserved. Step 100 is the state maintenance or state preparation step, performed to ensure that information is not leaked when data values are first assigned to registers. Of course, step 100 may be omitted if the registers are known to have appropriate initial values. In embodiments that recycle registers, memory locations, latches, etc., variables may be prepared (by setting them to a state maintenance value) between uses.

At step 105, the inputs to the function $a_2$ and $b_2$ are received in two-digit binary representation such that "TRUE" is represented by 10 and "FALSE" is represented by 01. At step 110, the four-bit variable, $a_4$ is created from $a_2$ by doubling the length of $a_2$ by concatenating together two copies of $a_2$. For example, binary 01 becomes 0101 and 10 becomes 1010 at this step. At step 120, the variable $b_2$ is similarly expanded into a four-bit variable, $b_4$. At step 115 the variable $x_4$ is created by computing the XOR of $a_4$ with the binary constant 1100. This operation is equivalent to setting $x_4$ equal to the concatenation of $NOT(a_2)$ and $a_2$, since in this representation the logical NOT operation is equivalent to XOR with 11.

At step 130, the bitwise AND of $x_4$ and $b_4$ is computed. This places the result of ($a_2$ AND $b_2$) in the lower two bits of $a_4$, and ((NOT $a_2$) AND $b_2$) in the upper two bits of r4. Four possible input operations can occur at any given bit of the AND operation at step 130: (0,0), (0,1), (1,0), and (1,1). In the four significant bit positions, AND is simultaneously computed on each of these four possible input pairs, regardless of the values of $a_2$ and $b_2$. Therefore, the number of internal state transitions is independent of $a_2$ and $b_2$, the Hamming weights of the two inputs to step 130 are both always equal to two, and the Hamming weight of the output is always equal to one.

At this point, the second lowest order bit of $r_4$ holds a 1 if the NAND result is FALSE, and holds a 0 if the NAND result is true. Steps 140 through 190 demonstrate that a leakless process can be used to transform this bit into the constant Hamming weight answer and select it as desired. Many variations on these steps are possible; for example, in hardware embodiments it might be possible to eliminate these steps entirely. (See the section below regarding hardware embodiments of leakless gates.)

Step 140 copies $r_4$ onto an eight bit variable, $r_8$, by doubling the length of $r_4$ and repeating its value. Step 150 sets the variable $s_8$ to equal $r_8$ XOR 11110000, effectively setting the upper four bits of $s_8$ equal to the ones complement of the bits in r4, while setting the lower four bits of $S_8$ equal to the bits of $r_4$.

Step 160 differentiates the NAND FALSE case from the three TRUE cases by setting $t_8$ equal to $s_8$ BITWISE AND the constant 00100010. This step effectively computes ($r_4$ XOR 1111) AND 0010 simultaneously with ($r_4$ AND 0010), which yields a constant Hamming weight result (i.e., the Hamming weight is one). The number of state transitions is also constant. Specifically, three bit positions of the operation at step 160 involve computing '0 AND 0', three positions compute '1 AND 0', one position computes '0 AND 1'and one position computes '1 AND 1'.

Step 170 produces the variable $U_8$, which has a Hamming weight of two, from the variable $t_8$, as shown in FIG. 1. At step 180, the exclusive OR of $U_8$ with the constant 00100010 is computed, which yields a Hamming weight two result (in $w_8$) and causes exactly two bit transitions—one from 1 to 0 and one from 0 to 1. Because the lower two bits of the upper nibble of $w_8$ are the complements of the lowest two bits of $w_8$, this step also produces the inverse of $result_2$. Finally, at step 190, the NAND result ($result_2$) is extracted from the two low order bits of $w_8$.

The operation of this NAND over the various input values is summarized in the table below:

| Input pair: ($a_2$, $b_2$) | (01, 01) (FALSE, FALSE) | (01, 10) (FALSE, TRUE) | (10, 01) (TRUE, FALSE) | (10, 10) (TRUE, TRUE) |
|---|---|---|---|---|
| $a_4$ | 0101 | 0101 | 1010 | 1010 |
| $b_4$ | 0101 | 1010 | 0101 | 1010 |
| $x_4$ (with $c_1$ = 1100) | 1001 | 1001 | 0110 | 0110 |
| $r_4$ = ($x_4$ AND $b_4$) | 0001 | 1000 | 0100 | 0010 |
| $r_8$ | 00010001 | 10001000 | 01000100 | 00100010 |
| $s_8$ | 11100001 | 01111000 | 10110100 | 11010010 |
| $t_8$ ($c_2$ = 00100010) | 00100000 | 00100000 | 00100000 | 00000010 |
| $u_8$ | 00110000 | 00110000 | 00110000 | 00000011 |
| $w_8$ ($c_3$ = 00100010) | 00010010 | 00010010 | 00010010 | 00100001 |
| $result_2$ | 10 (TRUE) | 10 (TRUE) | 10 (TRUE) | 01 (FALSE) |

Many variations on the steps given in this example implementation will be evident to one of skill in the art. Hardware, firmware, and microcode variations of gates using these algorithms with Hamming weight invariant bit representations will also be evident.

Implementations of other gates such as NOT, AND, OR, NOR, and XOR will also be evident. For example, using methods well known in the art, these binary operations can be constructed from NAND operations. Leak minimized forms of all standard Boolean operations can thus be constructed from a leak minimized NAND operation. For example, given Boolean inputs A and B:

NOT(A)=NAND(A,A).
AND(A,B)=NOT(NAND(A,B)).
NOR(A,B)=AND(NOT(A),NOT(B)).
OR(A,B)=NOT(NOR(A,B)).
XOR(A,B)=AND(OR(A,B), NAND(A,B)).

Optimized exemplary implementations of NOT, XOR and NOR gates are also described, below. More complex functions, including cryptographic functions such as the DES algorithm, can be constructed from any (optimized or not optimized) of these fundamental leak minimized units.

Other Leak Minimizing Gates

Figure 2:
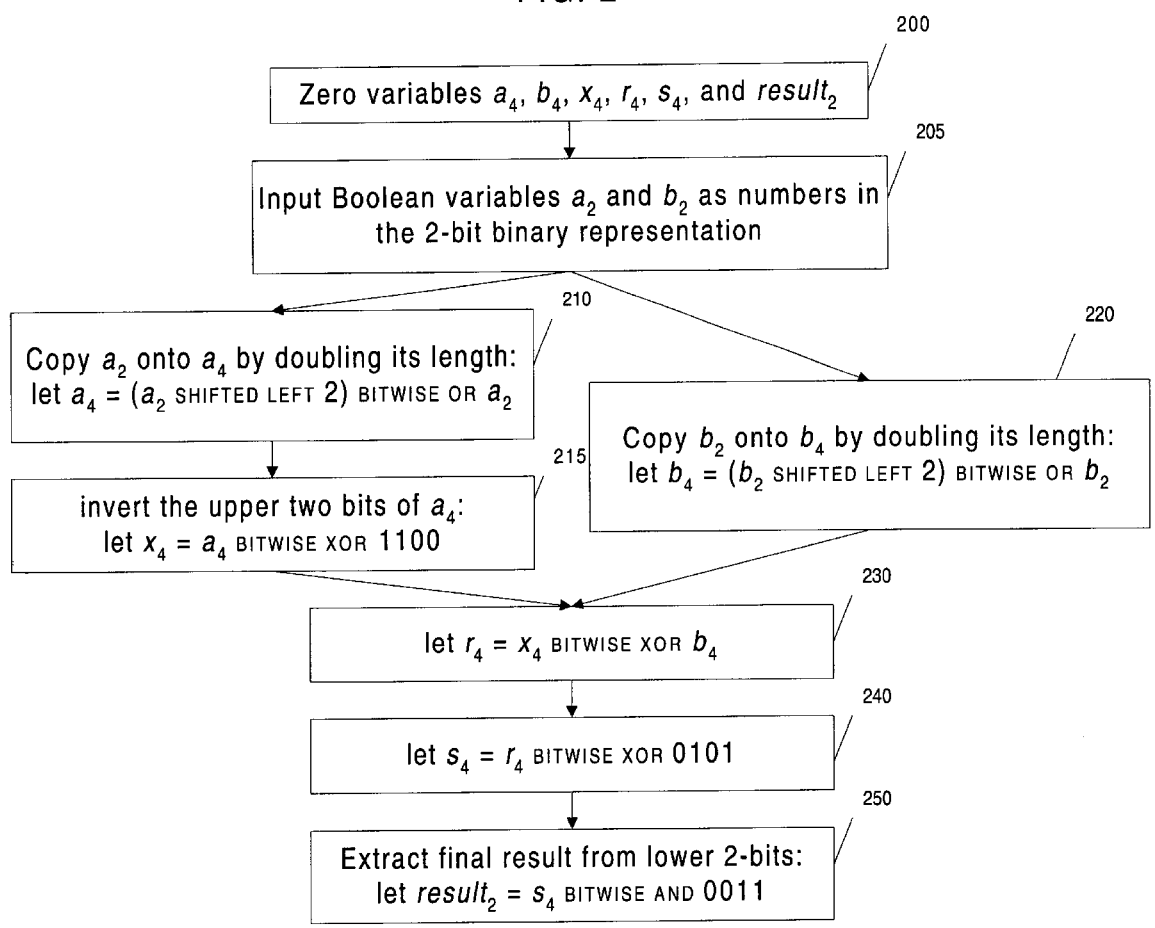
FIG. 2 shows an exemplary leak minimized method for computing XOR.

An exemplary implementation of the leakless exclusive OR function (XOR) is provided in FIG. 2. At step 200, the variables $a_4$, $b_4$, $x_4$, $r_4$, $s_4$, and $result_2$ are initialized to a known state. This step is analogous to step 100 of FIG. 1. At step 205, the inputs to the function ($a_2$ and $b_2$) are received in two-digit binary representation such that "TRUE" is represented by 10 and "FALSE" is represented by 01. At step 210, the four-bit variable, $a_4$ is created from $a_2$ by doubling the length of $a_2$ by concatenating together two copies of $a_2$. For example, 01 becomes 0101 and 10 becomes 1010. At step 220, the variable $b_2$ is similarly expanded into a four-bit variable $b_4$. At step 215 the variable $x_4$ is created by computing the XOR of a4 with the binary constant 1100. This is equivalent to setting $X_4$ equal to the concatenation of NOT $a_2$ with $a_2$, and takes advantage of the fact that in this representation the logical NOT operation is equivalent to XOR with 11.

At step 230, the bitwise XOR of $x_4$ and $b_4$ is computed and placed in $r_4$. This computes $a_2$ XOR $b_2$ in the lower two bits of $r_4$, and (NOT $a_2$) XOR $b_2$ in the upper two bits of $r_4$. One of these 2-bit halves will yield 00 while the other will yield 11. If $a_2$ equals $b_2$, then the value of $r_4$ will be 1100; otherwise it will be 0011. Each of the four possible bitwise XOR operations is computed. The half of the result equal to 00 is produced from the bit-operations 0 XOR 0=0, and 1 XOR 1=0; the half of the result equal to 11 is produced from the bit-operations 0 XOR 1=1 and 1 XOR 0=1. Thus, the number of internal state transitions is independent of $a_2$ and $b_2$, and the Hamming weight of the output is constant at two. To summarize, the operation is leakiess, with the Hamming weight of each of the inputs equal to two, the Hamming weight of the output equal to two, and the number of state transitions independent of the value of a2 or $b_2$.

At step 240, the variable $s_4$ is generated by computing the XOR of the variable $r_4$ with the constant 0101. This causes one of the upper and one of the lower bits of $r_4$ to change, one from high to low and the other from low to high. The number of transitions at this step is thus independent of the input data, and the result has a constant Hamming weight. At step 250 the result ($result_2$), in the two-bit binary format with balanced Hamming weight, is produced from the variable $s_4$.

The following table shows the possible input parameters with the corresponding processing intermediates and results:

| Input pair: ($a_2$, $b_2$) | (01, 01) (FALSE, FALSE) | (01, 10) (FALSE, TRUE) | (10, 01) (TRUE, FALSE) | (10, 10) (TRUE, TRUE) |
|---|---|---|---|---|
| $a_4$ | 0101 | 0101 | 1010 | 1010 |
| $b_4$ | 0101 | 1010 | 0101 | 1010 |
| $x_4$ | 1001 | 1001 | 0110 | 0110 |
| $r_4$ | 1100 | 0011 | 0011 | 1100 |
| $s_4$ | 1001 | 0110 | 0110 | 1001 |
| $result_2$ | 01 (FALSE) | 10 (TRUE) | 10 (TRUE) | 01 (FALSE) |

Figure 3:
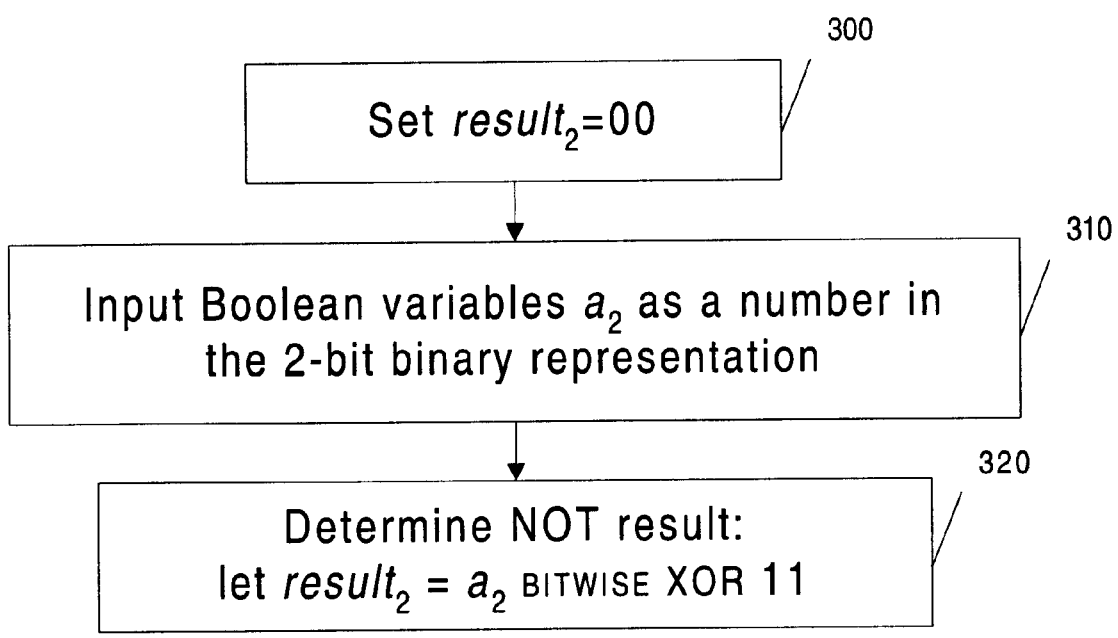
FIG. 3 shows an exemplary leak minimized method for computing NOT.

While a leakless NOT gate can be constructed from a leakless NAND, as described previously, FIG. 3 demonstrates a more straightforward exemplary implementation of a leakless NOT. The Boolean input values are represented using the 2-bit constant Hamming weight representation described previously. In this example, as in the preceding NAND example, TRUE is mapped to 10 and FALSE to 01. However, due to the simplicity of the leakless NOT operation, it is also correct when TRUE is mapped to 01 and FALSE to 10. At step 300 the variable $result_2$ is zeroed. At step 310, the Boolean input to the function is received in two-bit binary representation in the variable $a_2$. At step 320 the result, $result_2$, is computed by inverting both bits of $a_2$. In hardware embodiments the leakless NOT may be even easier to compute, as a simple two-bit permutation.

Figure 4:
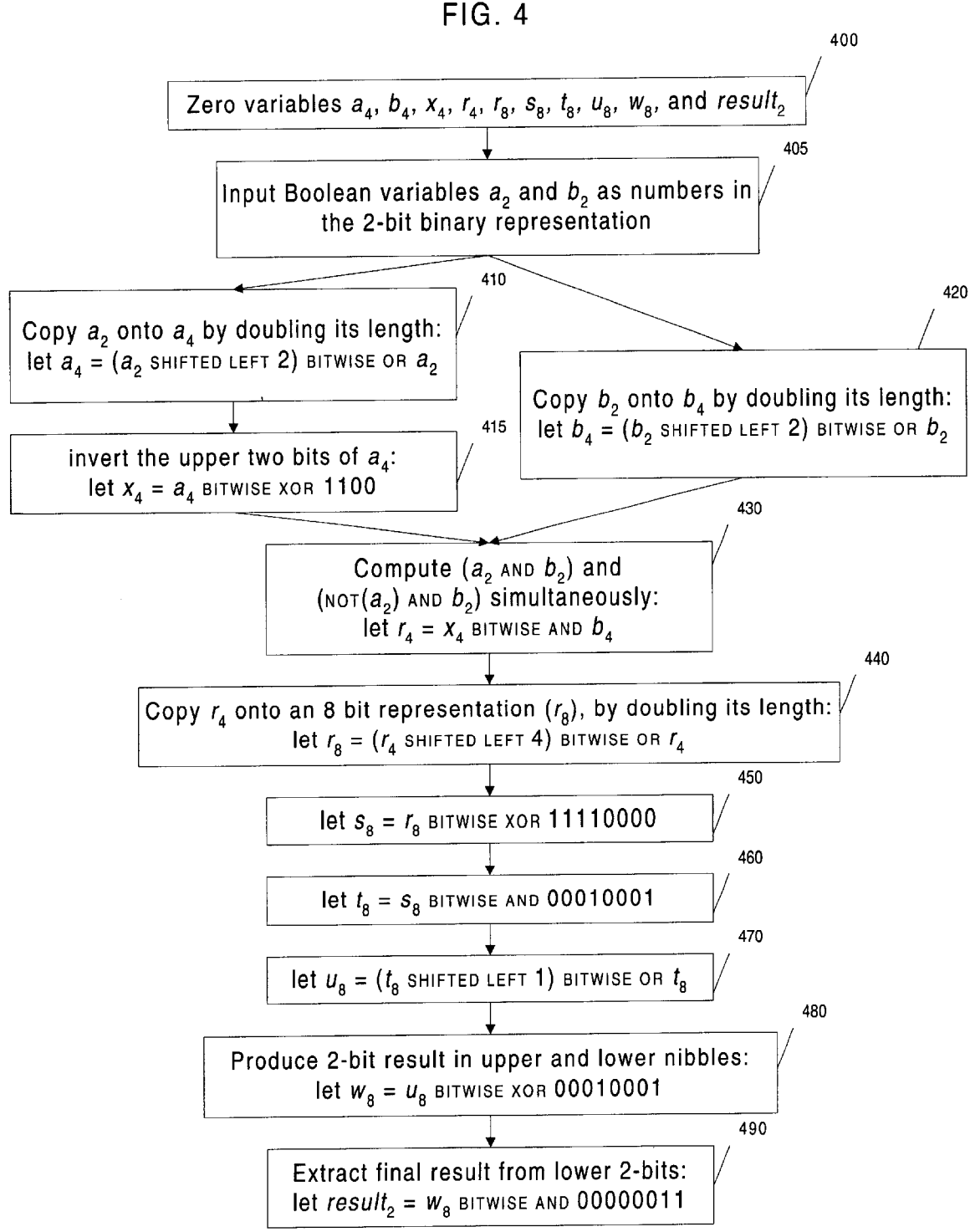
FIG. 4 shows an exemplary leak minimized method for computing NOR.

An additional instruction, LEFT SHIFT, is used to compute NOR. This instruction corresponds, for example, to the Intel 80x86 family assembly language instruction SHL, and is equivalent to the RIGHT SHIFT (SHR) instruction except that bits are shifted to the left instead of to the right. LEFT SHIFT is assumed to leak the Hamming weight of the variable being shifted and the difference in Hamming weight between the input and output, if any. FIG. 4 shows an exemplary embodiment of a leakless NOR operation.

At step 400, the intermediate variables $a_4$, $b_4$, $x_4$, $r_4$, $r_8$, $s_8$, $t_8$, $u_8$, $w_8$ and $result_2$ are initialized to zero. As noted previously, other initialization values are possible. At step 405, the inputs to the function, $a_2$ and $b_2$, are received in the two-digit binary representation described previously. At step 410, the four-bit variable $a_4$ is created from $a_2$ by doubling the length of $a_2$ by concatenating together two copies of $a_2$. For example, the binary value 01 becomes 0101 and 10 becomes 1010 at this step. At step 420, the variable $b_2$ is similarly expanded into a four-bit variable $b_4$. At step 415 the variable $x_4$ is created by computing the XOR of $a_4$ with the binary constant 1100.

At step 430, the bitwise AND of $x_4$ and $b_4$ is computed and placed in $r_4$. This computes $a_2$ AND $b_2$ in the lower two bits of $r_4$, and (NOT $a_2$) AND $b_2$ in the upper two bits of $r_4$. At step 430, each of the four possible AND operations is always computed, so the number of internal state transitions is independent of $a_2$ and $b_2$ and the Hamming weight of $r_4$ is always one. At step 440, $r_4$ is doubled in length to create an eight-bit variable $r_8$. At step 450, $s_8$ is created by inverting the top four bits of $r_8$, setting the lower four bits of $s_8$ equal to $r_4$ and the top four bits of $s_8$ equal to the binary ones compliment of $r_4$. Step 460 selects just the first and fifth bits of $s_8$ and places them in the variable $t_8$. Since these bits are complements, one will be set and the other zero; and $t_8$ will have the Hamming weight one. Step 470 creates the Hamming weight two variable $u_8$ from the variable $t_8$. In raw binary, $u_8$ will have either the value 00110000 or 00000011. Representations of the final result and its complement are simultaneously produced within $w_8$ at step 480. At step 490, the final result is produced in the two-bit binary format.

Other variations and embodiments of leakless logic operations will be evident to one of average skill in the art. For example: other logic operations and more complex functions can be implemented; alternate embodiments can use different sequences of logic operations; implementations can be optimized for specific applications; alternate embodiments can balance characteristics in addition to (or instead of) Hamming weight and state transitions; etc. One embodiment of particular note is a compiler that automatically converts a high-level description of a computational operation into a sequence of leakless operations of the invention. Such compiler can be used to simplify the design and implementation of complex leakless systems. Alternatively, an interpreter can convert a sequence of operations into a set of leakless steps, or use leakless basic operations to implement the interpreted codes.

Hardware Analogs

The invention can also be used to construct leakless hardware gates. A very simple approach for designing a leakless hardware gate is to construct a sequentially clocked circuit with functionality identical to the methods described previously. However, special hardware implementations of these gates can be optimized to take less space and provide faster computational performance. Certain additional optimizations are possible because some functions (such as shifts and permutations) can be implemented trivially in hardware and because some intermediate steps of the algorithms outlined above can be eliminated or optimized. Also, by designing at the hardware level, a designer obtains greater control over a system's characteristics, since features such as the gate layout, the routing and containment of intermediate signals, and the electrical properties of intermediate signal paths can be chosen. As in other implementations, logic values (TRUE and FALSE) in hardware leakless gates may be represented by constant Hamming weight pairs of voltage levels. Similarly, the number of state transitions with respect to time (e.g. capacitors that drain, transistors that switch from on to off or from off to on, etc.) can be made constant in response to input values. Transistors and other circuit elements can be reset to neutral intermediate states between computations.

Figure 5:
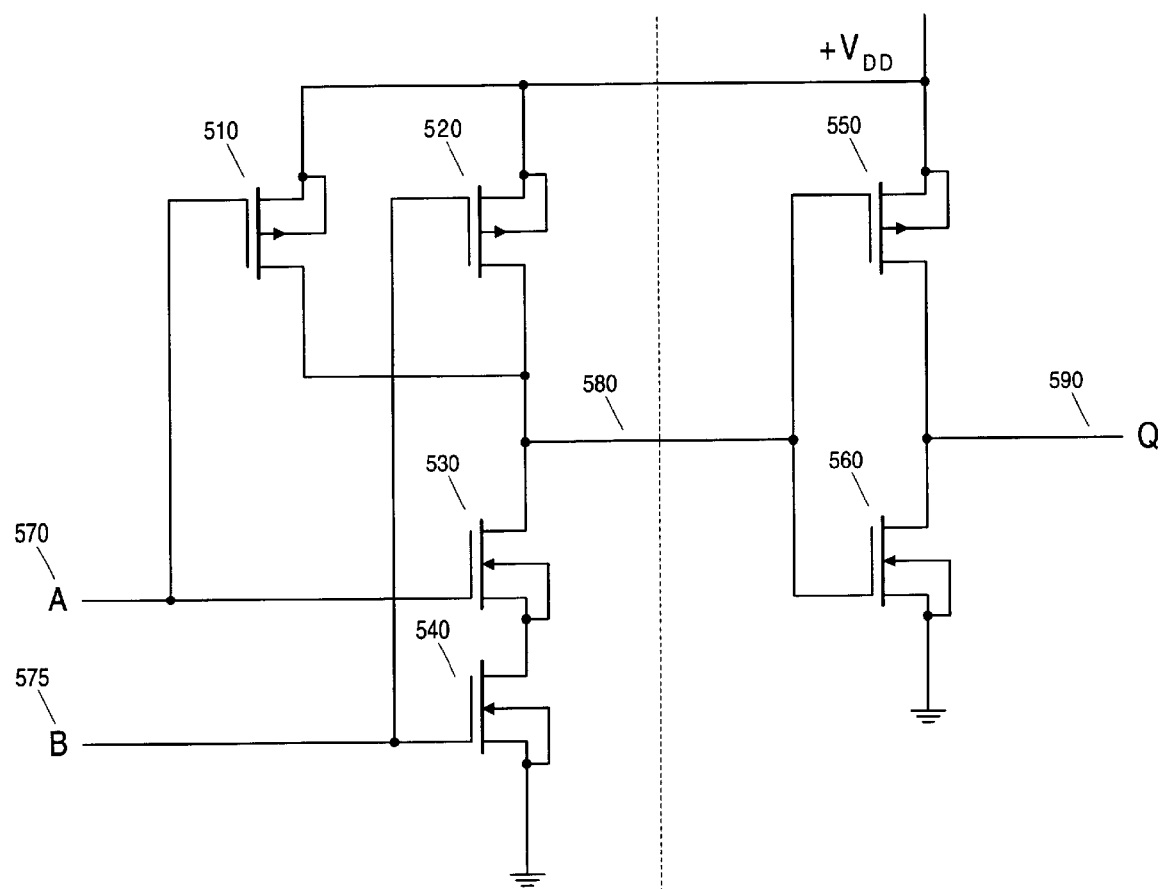
FIG. 5 shows a CMOS NAND gate of the background art.

A typical CMOS NAND of the background art is built out of four transistors. FIG. 5 shows a CMOS AND gate of the background art built from a NAND and a NOT. It contains three p-type MOS transistors, labeled 510, 520, and 550, and three n-type MOS transistors, labeled 530, 540, and 560. The p-type transistors 510 and 520 have identical design parameters and are set in parallel, so their behavior should be virtually identical for a state transition in input A 570 or a transition in input B 575. The n-type transistors 530 and 540 are positioned in series, and the behavior of the gate in response to a A=TRUE, B=FALSE input may be somewhat different from the behavior in response to the input A=FALSE, B=TRUE. Although ideal CMOS logic does not draw current when in a quiescent state, this NAND gate draws some current whenever its inputs change because of capacitance in the MOSFET transistors and signal lines, and because momentary current paths from VDD to ground may be created while transistors are switching. The CMOS NOT gate similarly draws a current spike whenever its input 580 changes. When the CMOS NAND is combined with a NOT to make an AND gate in systems of the background art, the current draw is thus correlated to the number of transitions in the input lines and to transitions in the value of the result 590. For additional information about the implementation and behavior of CMOS logic gates of the background art, see *The Art of Electronics*, $2^{nd}$ edition, by Horwitz and Hill (Cambridge University Press, 1989), pages 153–156 and 969–974. As will be described below, one hardware embodiment of the present invention constructs leakless NAND and NOT gates from CMOS gates of the prior art.

Leakless hardware gates are designed such that all possible valid inputs produce virtually identical electrical characteristics for a set of properties that may include, but is not limited to, the number of switching transitions in pMOS and nMOS transistors, the capacitive load on input lines, current draw with respect to time, capacitive loads that are connected to or disconnected from power lines, and the response time of the gate.

Figure 6:
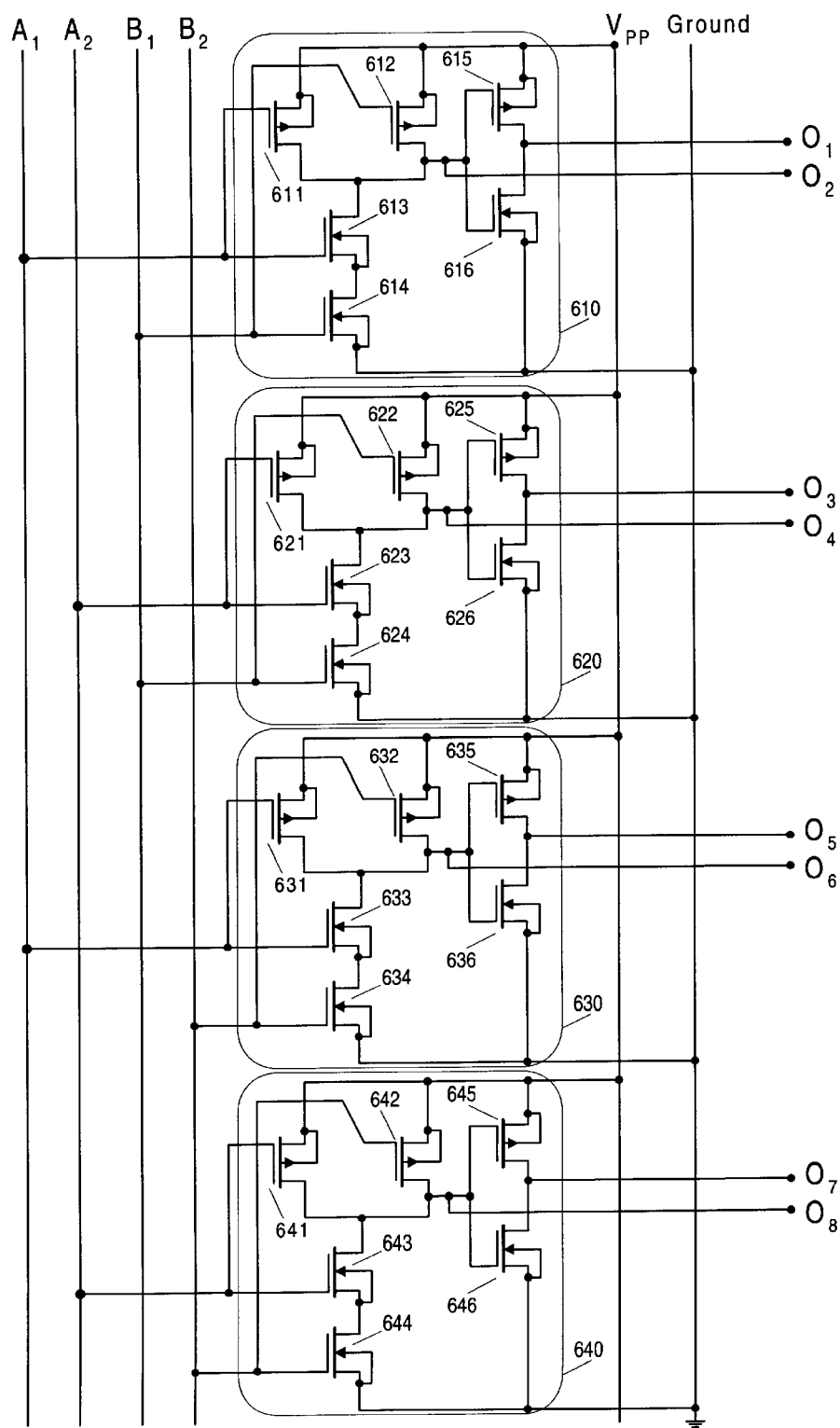
FIG. 6 shows an exemplary CMOS implementation of a leakless NAND gate.

FIG. 6 shows an exemplary embodiment of a leakless NAND using CMOS logic. The gate has two inputs A and B, which are provided as two bit constant Hamming weight representation where $A_1$ and $A_2$ have the respective values 0,1 for a logic FALSE and the values 1, 0 for a logic TRUE. As in the leakless gate algorithms outlined above, the hardware embodiment of the present invention has identical transistor switching behavior for all inputs and therefore has identical electrical behavior for all logic operations. Between computations, the effects of the preceding computation on the system's state may be cleaned out (preferably using a zeroization process that itself has a constant number of state transitions), as may be implemented by grounding inputs $A_1$, $A_2$, $B_1$, and $B_2$.

The exemplary NAND gate shown in FIG. 6 is constructed from four AND gates of the background art. The NAND outputs share the two bit constant Hamming weight representation and are labeled $O_1$ and $O_2$, with $O_1$ being the most significant bit. For the result of an AND operation, these lines may be read in the opposite order, i.e. reading $O_2$ as the most significant bit. The symmetrical operation of this exemplary leakless gate also yields the result of the logical functions NOR and OR of the inputs. The NOR value may be read from outputs $O_7$ and $O_8$, with $O_7$ being the higher order bit. The OR result corresponds to interpreting these in the opposite order, i.e. as with $O_8$ as the more significant bit. In embodiments of the invention, it might be advantageous that any unused outputs (such as $O_3$, $O_4$, $O_5$, and $O_6$ in FIG. 6) be connected to loads impedance matched to the loads attached to the ordinary outputs, to minimize possible detectable effects due to uneven loading of the outputs.

The following analysis of the behavior of this gate will assume that $V_{DD}$ is +5 volts and Ground is 0V, and for convenience will represent the voltage level +5V by the digit 1 and voltage level 0V by the digit 0. Small deviations from +5V or 0V will be ignored. Once state-cleared, the leakless NAND gate has identical electrical behavior for any input pair (A, B). It will also behave identically even if there is a slight variation in the input timing (e.g. if the input A arrives before the input B, the attackers will remain unable to determine the values of A, B or the result.) To maintain symmetry, the leakless NAND should have identical NMOS transistors, pMOS transistors, wire lengths, and capacitive wiring loads. While not essential, logic design principles of the prior art should be applied to equalize the gate switching time. For additional information about such considerations, see the section below entitled "Circuit Matching."

When the state maintenance step is applied to the leakless NAND, each pair of input wires corresponding to a data element is reset to a reference state or value, such as may be achieved by setting all inputs to 0. Setting the inputs to zero causes all four AND gates to simultaneously compute the logic operation 0 AND 0. If the gate inputs previously held valid values in the two-wire balanced Hamming weight representation, then this will result in a constant (leakless) set of transistor transitions, as will be demonstrated, below. When values for A and B are input, exactly one of input lines $A_1$ and $A_2$ transitions from 0 to 1, as does exactly one of input lines $B_1$ and $B_2$. For all 4 possible input cases, the four AND gates simultaneously compute 1 AND 1, 1 AND 0, 0 AND 1, and 0 AND 0. Because the four AND gates of the exemplary embodiment are virtually identical, the overall electrical behavior of this entire system is equivalent for any set of inputs A and B.

The electrical symmetry of the exemplary leakless NAND gate is demonstrated by the transistor behavior summarized in the following table. Each cell indicates which transistors, within the subunit defined by the row, change state when the input defined by the column is applied. The table assumes that the gate has been previously cleared, by setting all four input lines to 0.

| INPUT | TRUE, TRUE | TRUE, FALSE | FALSE, TRUE | FALSE, FALSE |
|---|---|---|---|---|
| $A_1A_2B_1B_2$ | 1010 | 1001 | 0110 | 0101 |
| FIG. 6 Labels of transistor transitions within subunit 610 | 611 612 613 614 615 616 | 611 613 | 612 614 | |
| FIG. 6 Labels of transistor transitions within subunit 620 | 622 624 | | 621 622 623 624 625 626 | 621 623 |
| FIG. 6 Labels of transistor transitions within subunit 630 | 631 633 | 631 632 633 634 635 636 | | 632 634 |
| FIG. 6 Labels of transistor transitions within subunit 640 | | 642 644 | 641 643 | 641 642 643 644 645 646 |

This table demonstrates that every possible input vector produces balanced electrical behavior. In the exemplary NAND gate shown in FIG. 6, the transistors may be grouped into four sets of six, with each set independently connected to $V_{DD}$, ground, and two of the input lines. Each of these sets of six comprises a CMOS AND subunit made by combining a NAND with a NOT. These subunits are labeled 610, 620, 630, and 640 in FIG. 6. The output of the leakless NAND is a combination of the AND and NAND outputs from subunit 610.

The table above demonstrates the response of various elements within the leakless NAND in response to each input. Before the input arrives, $A_1A_2B_1B_2$ is 0000, and all subunits are in the same state. When certain input lines rise, certain transistor switches change state. For example, in response to the input (TRUE, TRUE), all transistors in subunit 610 change state, along with transistors 622 and 624 in subunit 620 and transistors 631 and 633 in subunit 630. For each other input combination, transistors in analogous positions (e.g., transistors 612, 622, 632, and 642 are in analogous positions) in other subgroups change state. There are four possible ways in which the set of transistors within each AND subunit can switch in response to the possible inputs. As can be seen from the table, one and only one set of transistors switches in each of the possible ways in each input case. Therefore, the overall electrical response of the leakless NAND is identical (or similar) for each of the possible valid input values of $A_1A_2$ and $B_1B_2$. In other words, the measureable behavior of the overall circuit is independent of the input.

Before the next NAND computation begins, the system state may be reset by again grounding all the inputs. This will result in exactly the same number of transitions as above, and the same counting argument as used above applies to demonstrate that the step will satisfy the exemplary leakless properties (i.e., constant Hamming weight and state transition count). The counting argument can be used to show that the system state can also be reset by setting all the inputs to 1.

Figure 7:
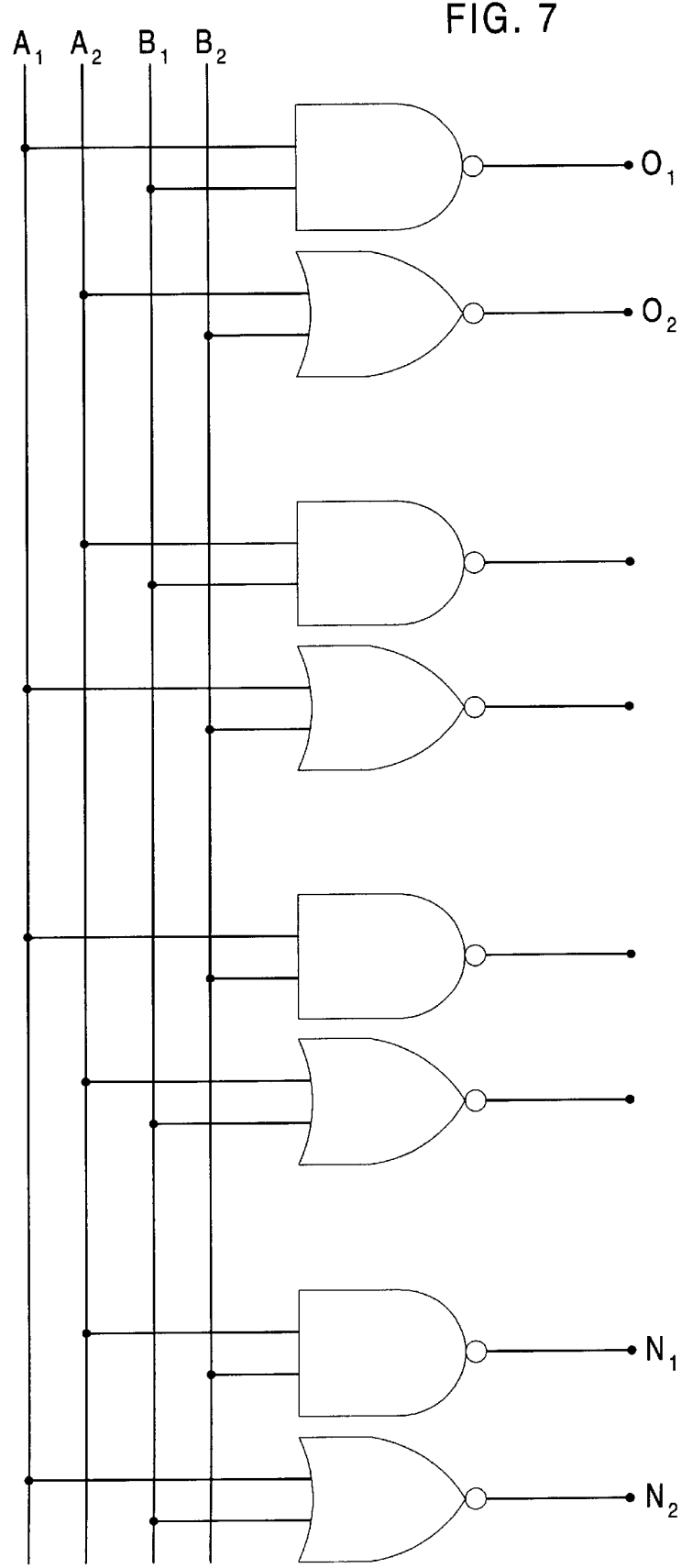
FIG. 7 shows another exemplary implementation of a leakless NAND gate.

For more complicated logic operations, the output from one leakless gate can be connected to the input of another leakless gate. In such cases it might also be convenient to propagate state maintenance values from one gate's output to the next gate's input. FIG. 7 shows an alternative embodiment of the leakless NAND gate, which can be chained in such a manner. The gate performs the same logic operation as shown above, but a state-clearing 0000 or 1111 input to the NAND gate produces the values 11 or 00 at the gate's output. In some cases these output values can be propagated to clear the state of leakless gates whose inputs can be connected to output of the NAND gate.

To simplify the diagram of FIG. 7, CMOS transistor implementations of NAND and NOR gates are represented symbolically. The individual NAND gates can, for example, be of the 4 transistor type as shown in FIG. 5, and the prior art NOR gates may, for example, be the CMOS dual of the NAND gate shown in FIG. 5. As in FIG. 6, the NAND gate of FIG. 7 outputs a two bit constant Hamming weight representation of NAND in outputs $O_1$ and $O_2$ (with $O_1$ being the more significant bit), and NOR from outputs $N_1$ and $N_2$ (with $N_1$ being the more significant bit). This embodiment of the NAND also minimizes leakage by having a constant number of state transitions from the cleared state (for valid inputs A and B).

Figure 8A:
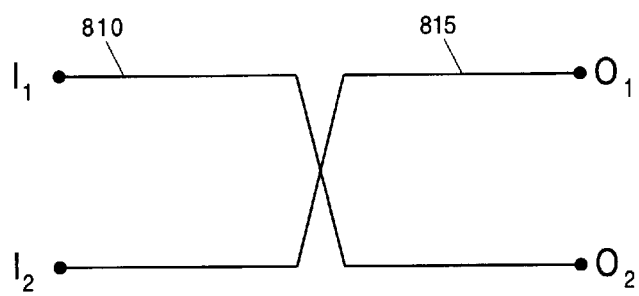
FIG. 8a shows an exemplary implementation of a leakless NOT gate
Figure 8B:
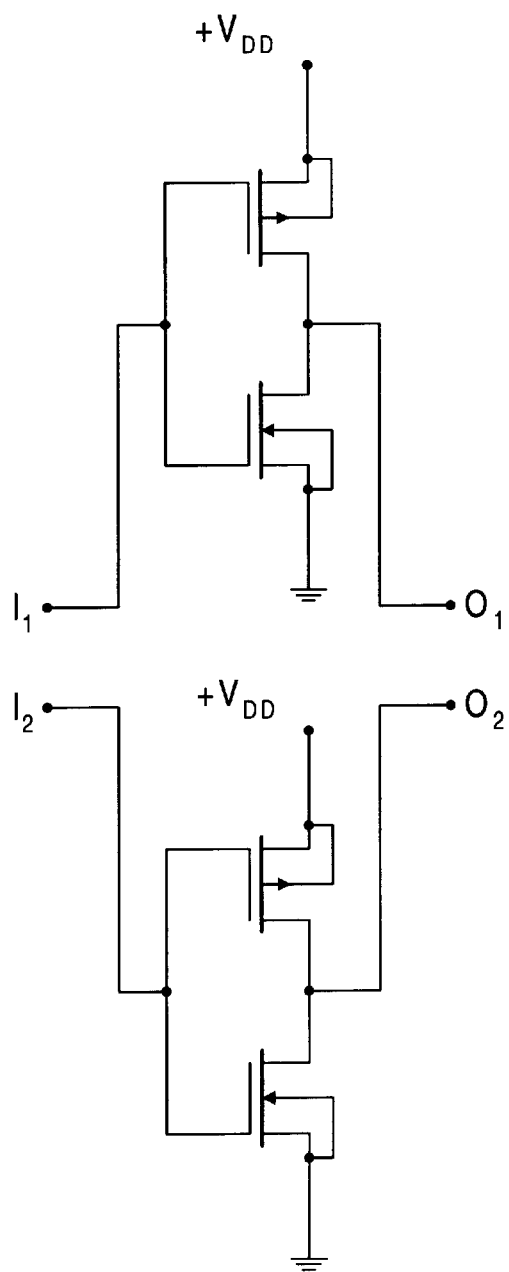
FIG. 8b shows another exemplary implementation of a leakless NOT gate.

Each of FIGS. 8a and 8b show an exemplary embodiment of a chainable leakless NOT gate. The embodiment of FIG. 8a is simply a permutation, and may even be implemented in many cases by simply routing wires 810 and 815 appropriately, such that the ordering of the outputs is the reverse of the ordering of the inputs. The embodiment of FIG. 8b uses two CMOS logic NOT primitives. These two NOT gates differ in how they treat state-clearing values: the NOT gate of FIG. 8a leaves the values 00 and 11 unchanged, while the second turns 00 into 11 and turns 11 into 00. This consideration might be relevant when the state maintenance step is performed upon leakless gates that are combined such that the output of a leakless NOT gate is directly tied to the input of another leak-minimizing gate.

Circuit Matching

When constructing a leakless (leak-minimizing) circuit, the effectiveness of the leak minimization process depends in some degree on low-level details of the circuit layout and design. Although it is not necessary, further leak reduction might be achievable with appropriate adjustments to a circuit. A first often-relevant consideration relates to the layout and routing of wires between components. Asymmetries in wire routing between leakless logic gates can introduce differences in capacitance, resistance, inductance, signal timing, etc., ultimately introducing differences in externally-measurable characteristics such as electromagnetic radiation and/or power consumption. A circuit designer can choose to lay out component gates, wires, etc. so that input and output lines are of equal lengths and have equivalent electrical characteristics. It is also possible, but not necessary, to apply logic design principles of the background art to equalize the gate switching times. Also, since small manufacturing differences can potentially introduce differences between otherwise equivalent operational units, identical NMOS transistors, pMOS transistors, etc. are desirable (as are balanced wire lengths, routing, capacitive loads, etc.). While assuring exact balancing is likely to be impossible, sufficient matching of components can prevent exploitable differences in externally-measurable characteristics.

Other Considerations

It should be apparent to one of skill in the art that the invention may be used to construct other hardware gates in which the Hamming weight of operands and the number of state transitions are independent of the parameters of computation. Examples of alternate functions include, but are not limited to, look-up tables, logic gates (such as XOR, AND, etc.), equality or assignment operations, subtraction, multiplication, permutations, symmetric cryptographic operations (DES, SHA, IDEA, etc.), and primitives used to construct asymmetric cryptographic operations (such as, but not limited to, modular multiplication). The invention can be applied to perform functions with more than two inputs (such as a three input logic gate, an eight-bit adder, a binary multiplier, an implementation of the DES f function, a floating-point arithmetic unit, a microprocessor core, etc.) It should also be apparent to one skilled in the arts that the invention can be used to construct leak-resistant operations from a variety of other (leaky) basic operations, such as, but not restricted to, XOR, EQU, addition, and table/memory lookup. Balanced Hamming weight bit representations other than the exemplary ones described can be used.

It should be apparent to one skilled in the arts that a general purpose leak-resistant computing module can be constructed by selecting outputs from a parallel group of leak resistant gates that perform different leak-resistant functions on the same set of operands. Additionally, implementations of other leak resistant circuit and microprocessor elements including, without limitation, flip-flops, memory cells, bus lines, connections, and flag registers should be evident to one of skill in the art.

In some microprocessors and other devices, input registers are fed into multiple instruction pipelines simultaneously, and instruction codes are used to select from among the outputs. In cryptographic devices it might be preferable to minimize the amount of activity that is correlated to the value of secret parameters, so embodiments of the invention can use instruction codes for selecting which values are provided to computation subunits instead of (or in addition to) selecting which result values are used.

As will be evident to one of skill in the art, state transition and Hamming weight equalization may be applied separately or together, or may be combined with other equalization methods (such as timing equalization). Methods of the present invention can be combined with other methods and techniques for improving or assuring security.

It will be apparent to one of ordinary skill in the art that the leakless hardware gates of the present invention can be constructed in other logic families, such as NMOS, TTL, ECL, RTL, DTL, SUTHL, $M^2L$, precharged MOS logic, and optical switching logic.

For reasons including size, cost, and scalability, embodiments of the invention in integrated circuits (ICs) are often advantageous. The invention may be incorporated into IC designs (including but not limited to those written in VHDL and other high-level hardware description languages) using automated software methods that use leakless operations of the present invention instead of conventional logic operations. Because the invention provides for low-level operations equivalent to those commonly used in integrated circuits, existing IC design and layout methods may be readily adapted.

The invention is not necessarily intended to provide for perfect security. Instead, it enables the construction of devices that are significantly more resistant to attack than devices of similar cost and complexity that do not use the invention. Multiple security techniques may be required to make a system secure; leak minimization may be used in conjunction with other security methods or countermeasures.

As those skilled in the art will appreciate, the techniques described above are not limited to particular host environments or form factors. Rather, they may be used in a wide variety of applications, including without limitation: cryptographic smartcards of all kinds including, without limitation, smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; transit fare collection (including bus, train, highway toll, etc.) systems; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCM-CIA cards; portable cryptographic tokens; and cryptographic data auditing systems.

All of the foregoing illustrates exemplary embodiments and applications of the invention, from which related variations, enhancements and modifications will be apparent without departing from the spirit and scope of the invention. Therefore, the invention should not be limited to the foregoing disclosure, but rather construed by the claims appended hereto.

What is claimed is:

1. A method for using a secret key to cryptographically process a message, comprising:
    (a) receiving a message to be cryptographically processed;
    (b) in a hardware device, cryptographically processing said message by performing a plurality of cryptographic suboperations thereon, each said suboperation:
        (i) taking an input, via at least one intermediate, to an output,
        (ii) including a number of computational state transformations, said number being independent of said message and of said key, and
        (iii) characterized such that the Hamming weights of said message, said intermediate, and said output are independent of said message and of said key; and
    (c) outputting said cryptographically processed message;
whereby external monitoring of said hardware device does not reveal useful information about said secret key.

2. A method for performing a balanced cryptographic operation on input data, comprising:
    (a) representing said input data using a constant Hamming weight representation; and
    (b) using a secret key, manipulating said input data to produce output data by performing a balanced cryptographic operation thereon;
thereby cryptographically processing said input data in a manner resistant to detection of said secret key by external monitoring of a hardware device performing said cryptographic operation.

3. The method of claim 2 wherein step (a) includes converting said input data from a non-constant Hamming weight representation, said method further comprising converting said output data to said non-constant Hamming weight representation.

4. The method of claim 2 wherein the number of state transitions performed during step (b) is balanced so as to be uncorrelated to the value of said secret key.

5. A method for performing a balanced cryptographic operation on input data, comprising:
    (a) representing said input data using a first constant Hamming weight representation;
    (b) manipulating said input data to produce intermediate data in said first constant Hamming weight representation;
    (c) converting said intermediate data from said first constant Hamming weight representation to a second constant Hamming weight representation; and
    (d) manipulating said intermediate data to produce output data according to said cryptographic operation;
thereby cryptographically processing said input data in a manner resistant to detection of said secret key by external monitoring of a hardware device performing said cryptographic operation.

6. A balanced cryptographic processing device comprising:
    (a) a secret key;
    (b) an input interface for receiving data;
    (c) a conversion unit to convert said data into a constant Hamming weight representation; and
    (d) a processor configured to perform a cryptographic operation on said data by using said secret key while preserving said constant Hamming weight representation.

7. A method for performing a balanced cryptographic operation using secret data, comprising:
    (a) performing a plurality of suboperations using said secret data and an operand; and
    (b) for each of said plurality of suboperations, simultaneously performing corresponding suboperations using
        (i) said operand and the complement of said secret data,
        (ii) said secret data and the complement of said operand, and
        (iii) the complement of said secret data and the complement of said operand;
thereby cryptographically processing said operand and said secret data in a manner resistant to detection of said secret data by external monitoring of a hardware device performing said cryptographic operation.

8. A method for performing a balanced computational process comprising:
    (a) receiving a first and a second input variable, each input variable having N bits;
    (b) creating a value of a first intermediate variable having 2N bits, each of a first half of said 2N bits being equal to a corresponding bit of said first input variable, each of a second half of said 2N bits being equal to the complement of a corresponding bit of said first input variable;
    (c) creating a value of a second intermediate variable having 2N bits, each of a first half of said 2N bits corresponding to a bit of said second input variable, each of a second half of said 2N bits being equal to a corresponding bit of said first half of said 2N bits;

(d) creating a value of a third intermediate having 2N bits, each bit being the result of a bitwise logical operation on a corresponding bit of said first intermediate variable and a corresponding bit of said second intermediate variable; and (e) extracting a result of said computational process from said third intermediate variable;

thereby cryptographically processing said input variables in a manner resistant to detection by external monitoring of a hardware device performing said computational process.

9. The method of claim 8 wherein said first and second input variables are represented in a constant Hamming code representation, wherein said method further comprises transforming said third intermediate variable such that said result is represented in said constant Hamming code representation.

10. The method of claim 9 wherein said step of transforming includes a constant number of state transitions.

11. A balanced cryptographic processing device comprising:

(a) an input interface for receiving a first and a second input variable to be used as inputs to a computation, each input variable represented by at least a first bit and a second bit, where said representation has a constant Hamming weight;

(b) a first computational unit for performing a bitwise logical operation on said first bit of said first input variable and said first bit of said second input variable;

(c) a second computational unit for performing said bitwise logical operation on said first bit of said first input variable and said second bit of said second input variable;

(d) a third computational unit for performing said bitwise logical operation on said second bit of said first input variable and said first bit of said second input variable; and (e) a fourth computational unit for performing said bitwise logical operation on said second bit of said first input variable and said second bit of said second input variable;

thereby cryptographically processing said input variables in a manner resistant to detection by external monitoring of a hardware device performing said operations.

12. The device of claim 11 further comprising a first load including an output interface for outputting an output of said computation, said output interface connected to an output of said first computational unit.

13. The device of claim 12 further comprising a second load connected to an output of said second computational unit, a third load connected to an output of said third computational unit, and a fourth load connected to an output of said fourth computational unit, each of said second, third, and fourth loads having an impedance matched to the impedance of said first load.

14. The device of claim 13 wherein said first, second, third, and fourth computational units have identical design parameters.

15. An electronic circuit configured to perform a computation on input data represented in a balanced Hamming weight format, said computation comprising:

(a) receiving said input data through an input interface;

(b) producing from said input data an intermediate variable represented in said balanced Hamming weight format;

(c) deriving a result from said intermediate variable; and (d) transmitting at least a portion of said result to a receiving circuit.

16. A method for reducing the amount of information available for detection through monitoring of the power consumption of a device during a digital cryptographic computation comprising:

(a) receiving input data represented by a plurality of sets of data bits in a representation format wherein:
 (i) each data bit can have one of two values,
 (ii) each set of data bits includes at least two data bits;
 (iii) the value of each set of data bits can be encoded as at least two functionally-equivalent combinations of values of said data bits;

(b) processing said input data through a series of substeps, wherein
 (i) said substeps combine said input data to compute intermediate data represented in said format, and
 (ii) by balancing at least one characteristic of said computation, the amount of power consumed at each substep is made not detectably correlated to the value of said intermediate data; and (c) producing an output result from said intermediate data.

17. The method of claim 16 wherein a plurality of said processing substeps include transforming said intermediate data from a first representation to a second representation, said first and second representation being functionally equivalent.

18. The method of claim 16 wherein the at least one characteristic balanced in step (b)(ii) includes the total Hamming weight of the representation of said intermediate data.

19. The method of claim 16 wherein the at least one characteristic balanced in step (b)(ii) includes the number of state transitions that occur during at least one of said substeps that are a function of the representation of said intermediate data.

20. The method of claim 16 wherein a plurality of said substeps of step(b) include computing a representation of said intermediate data from the XOR of two data bits of said input data.

21. The method of claim 16 wherein said computation is performed using a circuit of hard-wired transistors.

22. The method of claim 16 wherein said computation is implemented in microcode.

23. The method of claim 16 wherein said computation is implemented in software as part of a cryptographic process using a secret key.

24. The method of claim 23 wherein said cryptographic algorithm is a symmetric block cipher.

25. A method for converting a definition of a computational device capable of performing cryptographic operations using a secret key into a definition of a digital circuit, comprising:

(a) receiving a machine-readable definition of said computational device;

(b) using a processor to compile at least a portion of a process for said operation by (i) converting said process into a sequence including a plurality of logic operations, and (ii) converting said plurality of logic operations into a plurality of operations for which the power consumption is balanced;

(c) writing an output file representing said plurality of balanced logic operations; and (d) transmitting said output file to a third party for fabrication into said digital circuit.

26. The method of claim 25 wherein each of a first plurality of bits represented in said machine-readable definition is represented in said output file by a second plurality of bits, wherein the Hamming weight of said second plurality of bits is independent of the individual values of said bits.

27. The method of claim 25 wherein said cryptographic operation comprises a block cipher, and said digital circuit is balanced to reduce a correlation between power consumption and a cryptographic processing intermediate variable.

28. The method of claim 25 wherein said digital circuit includes a multiplier.

29. A method for converting a definition of a computational process into a definition of software whose power consumption is balanced, comprising the steps of:

(a) receiving a machine-readable definition of said computational process;

(b) using a processor to compile at least a portion of said process by (i) converting said process into a sequence of operations including a plurality of logic operations, and (ii) converting said plurality of logic operations into a plurality of operations for which the power consumption is balanced; and (c) writing an output file representing said plurality of balanced logic operations expressed as a sequence of executable instructions.

30. The method of claim 29 wherein said computational process comprises a block cipher.

31. A cryptographic processing device for securely performing a cryptographic processing operation in a manner resistant to the discovery of a secret by external monitoring, comprising:

(a) an input interface for receiving a quantity to be cryptographically processed and for converting said quantity into an expanded balanced representation; and (b) a processing circuit operatively connected to said input interface and including:

(i) a plurality of main logic subunits configured to in compute the result of said cryptographic processing operation; and (ii) a plurality of additional logic subunits of composition similar to said main logic units which operate simultaneously with said main logic units to balance the power consumption of the computation performed by said main logic units; and (c) an output interface operatively connected to said processing circuit for outputting said result of said cryptographic processing operation.

32. The method of claim 31 wherein said cryptographic processing operation comprises a block cipher.

33. The method of claim 1, 2, 3, 4, 5, 7, 8, 9, 10, 16, 17, 18, 19, 20, 21, 22, 23, 31, or 32 implemented in an ISO 7816-compliant smart card.

34. The device of claim 6, 11, or 13 where said device comprises an ISO 7816-compliant smart card.

* * * * *